(12) United States Patent
Ehrenberg et al.

(10) Patent No.: US 9,393,557 B2
(45) Date of Patent: Jul. 19, 2016

(54) ANIONIC EXCHANGE ELECTROLYTE POLYMER MEMBRANES

(75) Inventors: Scott G. Ehrenberg, Port Richey, FL (US); Timothy Tangredi, Trinity, FL (US)

(73) Assignee: Dais Analytic Corporation, Odessa, FL (US)

( * ) Notice: Subject to any disclaimer, the term of this patent is extended or adjusted under 35 U.S.C. 154(b) by 399 days.

(21) Appl. No.: 13/521,105

(22) PCT Filed: Jan. 7, 2011
(Under 37 CFR 1.47)

(86) PCT No.: PCT/US2011/020502
§ 371 (c)(1),
(2), (4) Date: Nov. 8, 2012

(87) PCT Pub. No.: WO2011/085186
PCT Pub. Date: Jul. 14, 2011

(65) Prior Publication Data
US 2013/0165538 A1 Jun. 27, 2013
US 2013/0338244 A9 Dec. 19, 2013

Related U.S. Application Data

(60) Provisional application No. 61/293,637, filed on Jan. 9, 2010.

(51) Int. Cl.
*B01J 41/00* (2006.01)
(52) U.S. Cl.
CPC ....................................... *B01J 41/00* (2013.01)
(58) Field of Classification Search
USPC ................................................... 521/27, 25
See application file for complete search history.

(56) References Cited

U.S. PATENT DOCUMENTS

| 4,051,898 | A |   | 10/1977 | Yoshino et al. |
|---|---|---|---|---|
| 4,248,821 | A |   | 2/1981 | Van Dellen |
| 5,239,010 | A |   | 8/1993 | Balas et al. |
| 5,348,691 | A |   | 9/1994 | McElroy et al. |
| 5,397,445 | A | * | 3/1995 | Umemura et al. ............ 204/534 |
| 5,468,574 | A | * | 11/1995 | Ehrenberg et al. ............ 429/493 |
| 5,677,074 | A |   | 10/1997 | Serpico et al. |
| 5,679,482 | A |   | 10/1997 | Ehrenberg et al. |
| 5,840,387 | A | * | 11/1998 | Berlowitz-Tarrant .. A61K 47/32 424/400 |
| 6,110,616 | A |   | 8/2000 | Sheikh-Ali et al. |
| 6,306,419 | B1 |   | 10/2001 | Vachon et al. |
| 6,383,391 | B1 |   | 5/2002 | Ehrenberg et al. |

(Continued)

FOREIGN PATENT DOCUMENTS

| WO | WO 2008/089484 A1 | 7/2008 |
|---|---|---|
| WO | WO 2012/033827 | 3/2012 |

OTHER PUBLICATIONS

U.S. Appl. No. 13/750,309, filed Jan. 25, 2013, Ehrenberg.
(Continued)

*Primary Examiner* — Peter D Mulcahy
*Assistant Examiner* — Henry Hu
(74) *Attorney, Agent, or Firm* — Mueting, Raasch & Gebhardt, P.A.

(57) ABSTRACT

The present disclosure provides a membrane having a first major surface and a second major surface and including one or more anionic exchange electrolyte polymers. The membranes can be useful for selectively mass transporting molecules and/or ions.

11 Claims, 3 Drawing Sheets

(56) References Cited

U.S. PATENT DOCUMENTS

| | | | |
|---|---|---|---|
| 6,399,235 | B1 | 6/2002 | Yen et al. |
| 6,413,298 | B1 | 7/2002 | Wnek et al. |
| 6,699,941 | B1 | 3/2004 | Handlin et al. |
| 6,723,757 | B1 * | 4/2004 | Kerres et al. ................. 521/27 |
| 6,746,582 | B2 * | 6/2004 | Heller et al. ............ 204/403.06 |
| 6,841,601 | B2 | 1/2005 | Serpico et al. |
| 7,001,950 | B2 | 2/2006 | Handlin, Jr. et al. |
| 7,067,589 | B2 | 6/2006 | Bening et al. |
| 7,169,848 | B2 | 1/2007 | Bening et al. |
| 7,169,850 | B2 | 1/2007 | Handlin, Jr. et al. |
| 7,179,860 | B2 | 2/2007 | Cao et al. |
| 7,186,779 | B2 | 3/2007 | Joly et al. |
| 7,990,679 | B2 | 8/2011 | Ehrenberg et al. |
| 8,222,346 | B2 | 7/2012 | Cao et al. |
| 2003/0096424 | A1 | 5/2003 | Mao et al. |
| 2003/0106680 | A1 | 6/2003 | Serpico et al. |
| 2004/0142910 | A1 | 7/2004 | Vachon et al. |
| 2005/0154144 | A1 | 7/2005 | Atwood et al. |
| 2006/0292208 | A1 | 12/2006 | Vachon |
| 2007/0003817 | A1 * | 1/2007 | Umeda et al. ................. 429/40 |
| 2007/0004830 | A1 | 1/2007 | Flood et al. |
| 2007/0020473 | A1 | 1/2007 | Umana et al. |
| 2007/0021569 | A1 * | 1/2007 | Willis .................. B01D 71/80 525/314 |
| 2007/0026251 | A1 | 2/2007 | Umana |
| 2007/0037927 | A1 | 2/2007 | Yang |
| 2007/0055015 | A1 | 3/2007 | Flood et al. |
| 2008/0017578 | A1 | 1/2008 | Childs et al. |
| 2010/0031817 | A1 | 2/2010 | Ehrenberg et al. |
| 2010/0170776 | A1 * | 7/2010 | Ehrenberg et al. ............ 202/168 |
| 2010/0261799 | A1 | 10/2010 | Vachon et al. |
| 2010/0273901 | A1 | 10/2010 | Ehrenberg et al. |
| 2012/0320497 | A1 | 12/2012 | Ehrenberg |

OTHER PUBLICATIONS

International Search Report and Written Opinion mailed Sep. 23, 2011 for PCT/US2011/020502 by the Korean Intellectual Property Office; 6 pgs.

International Preliminary Report on Patentability mailed Jul. 19, 2012 for PCT/US2011/020502 by the International Bureau of WIPO; 4 pgs.

Jenkins et al., "Glossary of Basic Terms in Polymer Science," *IUPAC, Pure Appl Chem*, 1996;68:2287-2311.

Odian, *Principles of Polymerization*, Table of Contents, Chapter 4—Emulsion Polymerization, 1991; pp. 352-353.

Ring et al., "Source-based nomenclature for copolymers," *Pure Appl Chem*, 1985;57(10):1427.

Zhang and Jiang, "Heat and mass transfer in a membrane-based energy recover ventilator," *J Membrane Science*, Oct. 1, 1999;163(1);29-38.

* cited by examiner

Step 1: Chloromethylation

Step 2: Aminonation

ANIONIC EXCHANGE ELECTROLYTE POLYMER MEMBRANES

This application is the §317 U.S. National Stage of International Application No. PCT/US2011/020502, filed 7 Jan. which claims the benefit of U.S. Provisional Application No. 61/293,637, filed Jan. 9, 2010, each of which are incorporated herein by reference in their entireties.

BACKGROUND

Permeable membranes have been used in a variety of applications that may require selective mass transport of molecules. Such applications include, for example, heating, ventilation, and air conditioning (HVAC) applications; gas conditioning; desiccation; distillation, desalination, fluid separation, and purification. However, the utility and/or efficiency of such applications is frequently limited by the properties of such permeable membranes and/or problems encountered in the use of such permeable membranes.

There is a continuing need for porous membranes with properties that can allow for efficient and reliable use in a wide variety of applications.

SUMMARY

In one aspect, the present disclosure provides a membrane having a first major surface and a second major surface and including one or more anionic exchange electrolyte polymers. The one or more anionic exchange electrolyte polymers include at least a first contiguous domain and a second contiguous domain that are phase separated. The first contiguous domain includes a plurality of repeat units having moieties with electrostatically bound negative ions and covalently bound positive ions. The second contiguous domain includes a plurality of repeat units with non-charge bearing moieties. At least a portion of the contiguous domains extend from the first major surface of the membrane to the second major surface of the membrane. In certain embodiments, the second contiguous domain forms an elastic matrix that supports the first contiguous domain. In certain embodiments, the second contiguous domain is plastic, rubbery, or semi-crystalline.

In certain embodiments, the membrane forms a permeable barrier that selectively allows molecules and/or ions that are soluble in the first contiguous domain to pass between the first and second major surfaces of the membrane. In certain embodiments, molecules that have large dipole moments or that can be dissolved in solvents that have large dipole moments can pass between the first and second major surfaces of the membrane. In some embodiments, the solubility of such large dipole moment molecules in the first contiguous domain is greater than 10 times the solubility in the first contiguous domain of low dipole moment molecules that do not pass between the first and second major surfaces of the membrane.

In certain embodiments, the membrane has high permittivity when exposed to DC or slowly varying AC voltages. In some embodiments, the membrane has a permittivity of at least 50, in other embodiments at least 1000, and in even other embodiments at least 10,000.

In another aspect, the present disclosure provides methods for selectively mass transporting molecules and/or ions. In some embodiments, the method includes: providing a membrane as described herein having molecules and/or ions in contact or in close proximity with a first major surface of the membrane; and allowing the molecules and/or ions that are soluble in the first contiguous domain to pass between the first and second major surfaces of the membrane.

Selectively permeable and ion-conducting anionic exchange electrolyte membranes that include statistical, random, or block copolymers that have self assembled through phase separation to form contiguous domains from the first surface of the membrane to the second surface of the membrane are disclosed herein. The phase separation can give these modified polymers superior ion transport, water mass transport, and other electrical properties useful in many applications. Such applications include water-conducting membranes for humidification of gases in chemical processes, electrochemical processes, water conducting membranes for heat and moisture exchange in heating/ventilation/air conditioning systems, and ion conducting membranes for the production and storage of electricity in fuels cells, batteries, and capacitors.

As used herein, "a," "an," "the," and "at least one" are used interchangeably and mean one or more than one.

As used herein, the term "comprising," which is synonymous with "including" or "containing," is inclusive, open-ended, and does not exclude additional unrecited elements or method steps.

The above brief description of various embodiments of the present disclosure is not intended to describe each embodiment or every implementation of the present disclosure. Rather, a more complete understanding of the disclosure will become apparent and appreciated by reference to the following description and claims in view of the accompanying drawing. Further, it is to be understood that other embodiments may be utilized and structural changes may be made without departing from the scope of the present disclosure.

DETAILED DESCRIPTION OF ILLUSTRATIVE EMBODIMENTS

Figure 1:
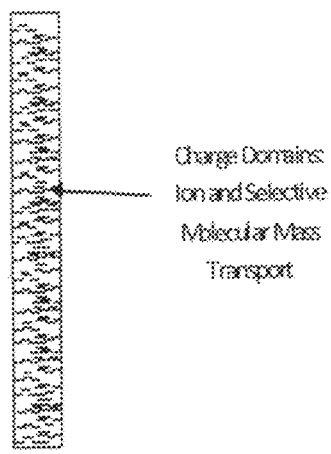
FIG. 1 is a schematic illustration of an exemplary membrane cross section showing charge domains and ion and/or moisture conducting paths from a first surface of the membrane to a second surface of the membrane.

In one aspect, the present disclosure relates to a membrane including a plurality of acid-stable and or base-stable polymer molecules each having at least one ion and mass conducting component covalently bonded to at least one flexible, plastic or rubbery or semi-crystalline connecting component. The membrane has ion and mass conducting components of the polymer molecules ordered such that a plurality of continuous ion and or mass conducting channels penetrates the membrane from a first surface to a second surface and such that the ion and mass conducting channels are situated in an elastic matrix formed by the flexible, plastic or rubbery or semi-crystalline connecting components. (See FIG. 1). Optimally, the channels have a cross-sectional dimension in the plane of the membrane of about 0.01 micormeter to 0.1 micrometer. (See FIG. 2).

The ion and mass conducting component may contain a moiety consisting of a covalently bound positive ion and an electrostatically bound negative ion. The polymer containing both the ion and mass conducting component and the elastic matrix formed by the flexible, plastic or rubbery or semi-crystalline connecting component forms an ionomeric polymer molecule also known as an anionic exchange electrolyte. The membrane formed from ionomeric polymer molecule includes a selective transfer membrane having a first surface and a second surface with the ability to transfer molecules which are soluble in the ion and mass conducting domains from the first surface to the second surface. The ionomeric polymer domains of the selective transfer membrane may form contiguous conduits suitable to provide for travel of high-dipole liquids or gases between the surfaces of the membrane. Additionally, the ionomeric polymer has a base resin and the base resin before ionomerization of the ionomeric polymer is selected from the group consisting of: polyethylene (PE), polypropylene (PP), polyethylene oxide (PEO), polystyrene (PS), polyesters, polycarbonate (PC), polyvinyl chloride (PVC), nylon, halogenated polymers or copolymers such as perfluorinated copolymers, poly(methyl methacrylate) (PMMA), acrylonitrile butadiene styrene (ABS), polyamide (PA), polytetrafluoroethylene (PTFE) (such as Gore-Tex®), polylactic acid (PLA), polyvinylidene chloride (PVDC), styrene-butadiene rubber (SBR), styrene-ethylene/butylenes-styrene (SEBS); styrene-ethylene/propylene-styrene (SEPS), ethylene-styrene interpolymer (ESI), styrene acrylate, polyetherether ketone (PEEK), polyethylene terephthalate (PET or PETE), polybenzimidazole (PM), phosphoric acid based membranes, Nafion® (sulfonated tetrafluoroethylene copolymer), and any combination thereof.

As disclosed herein, the selective transfer membrane can include a barrier layer including a polymer or polymer composite that is permeable to high dipole moment material. In certain instances, the membrane assembly includes a selective transfer membrane having a first surface and a second surface and further including a porous support having a first surface and a second surface, the second surface of the selective transfer membrane being positioned adjacent to the first surface of the porous support, the first surface of the membrane assembly being the first surface of the selective transfer membrane and the second surface of the membrane assembly being the second surface of the porous support, which may be hydrophilic.

As used herein, the term "polymer" includes, but is not limited to homopolymers, copolymers, such as for example, block, graft, random and alternating copolymers, terpolymers, etc. and blends and modification thereof. In addition, unless otherwise specifically limited, the term "polymer" also includes all possible geometric configuration of the molecule including, but not limited to, isotactic, synthdiotactic, atactic and random symmetries. Further, the term "polymer" includes, but is not limited to hydrocarbon polymer and fluoropolymer.

In the polymer, suitable aromatic vinyl monomer which may be employed according to the present disclosure include styrene as well as α-methyl styrene, the lower alkyl or phenyl-ring substituted derivatives of styrene, such as ortho-, meta-, and para-methylstyrene, or mixtures thereof, and ring halogenated styrene, vinyl benzocyclobutanes and divinylbenzene.

In the polymer, aromatic vinyl monomers and olefins the monomers are preferably combined in a proportion so as to achieve aromatic vinyl monomer content of at least 1.0 mole percent in the resulting polymer more preferably from 1.5 to less than 95 mole percent, highly preferably 5 to 65 mole percent, and most preferably from more than 8 up to 64 more percent.

A block copolymer which has, as it constituents, a polymer block (A) having as a unit an aromatic vinyl monomer such as styrene, α-methyl styrene, styrene whose hydrogen atom bonded to the benzene ring can be replaced with 1 to 4 alkyl groups (methyl, ethyl, n-propyl and isopropyl, n-butyl, isobutyl, tert-butyl groups, etc.), vinylnaphthalene, vinylanthracene, vinylpyrene, vinyl pyridine, etc.; and has anion-conducting groups on the polymer block (A), and a flexible polymer block (B) having as a unit olefin is composed of alkene units, conjugated diene units or the like. Both Polymer block (A) or (3) can contain one or plural other monomer units so long as they do not unduly effect the properties of the polymer, such monomers include, for example, (meth)acrylic ester ((methyl(meth)acrylate, ethyl(meth)acrylate, butyl (meth)acrylate, etc); vinyl esters (vinyl acetate, vinyl propionate, vinyl butyrate, vinyl pivalate, etc.); vinyl ether (methyl vinyl ether, isobutyl vinyl ether, etc.). These can be used alone or in a combination of two or more. When two or more are copolymerized, the form thereof can be random copolymerization, block copolymerization, graft copolymerization, and/or tapered copolymerization.

The polymer may be blended with synthetic polymer to provide blends have desirable properties. In particular, polyethylene, ethylene/α-olefin copolymers, polypropylene, polystyrene, styrene/acrylonitrile copolymer (including rubber modified derivatives thereof), syndiotactic polystyrene, polycarbonate, polyamide, aromatic polyester, polyisocyanate, polyurethane, polyacrylonitrile, silicone, and polyphenyloxide polymer.

The anionic exchange polymer electrolyte layer includes a polymer having a plurality of chemically bound positive ions and a plurality of electrostatically bound negative ions. A wide variety of anionic exchange polymer electrolytes can be used in the devices, methods, and systems disclosed herein. Exemplary chemically bound positive ions include ammonium (e.g., quaternary ammonium), phosphonium (e.g., quatemary phosphonium), sulfonium (e.g., tertiary sulfonium), and combinations thereof. Exemplary electrostatically bound negative ions include, for example, halides (e.g., chloride, fluoride, bromide, and/or iodide), pseudohalides (e.g., azides, isocyanides), $SbF_6^-$, $PF_6^-$, and combinations thereof. In certain embodiments, the anionic exchange polymer electrolyte layer can include an optionally crosslinked anionic exchange polymer (e.g., an iodide anionic exchange polymer).

In certain embodiments, the anionic exchange polymer electrolyte can be a polystyrene having $-CH_2NR_3^+X^-$ groups attached to the aromatic ring (e.g., in the ortho and/or para positions) of at least a portion of the styrene units, wherein each R can independently represent a C1-C10 alkyl group, and X can represent a halide. A particularly preferred anionic exchange polymer electrolyte can be a polystyrene having $-CH_2N(CH_3)_3^+I^-$ groups attached to the aromatic ring of at least a portion of the styrene units, which can conveniently be prepared by aminating a chloromethylated polystyrene with a tertiary amine, and exchanging chloride for iodide.

In general, ionomers contain both polar and non-polar moieties, which may each group together. The polar ionic moieties tend to cluster together and separate from the non-polar backbone moieties, which allows for thermoplasticity, especially when heated. This increased thermoplasticity can allow for increased energy storage and increased ability to cycle. Additionally, the non-ionic areas can exhibit adhesive properties. In certain embodiments, a balance between thermoplasticity and flow at a certain temperature can be desirable.

In certain embodiments, the anionic exchange polymer electrolytes can include, for example, arene-containing linear side chains, non-arene-containing linear side chains, saturated linear side chains, unsaturated linear side chains, and flexible hydrocarbon linear side chains. In certain embodiments, the anionic and/or cationic exchange polymer electrolytes can be, for example, unsubstituted and/or substituted (e.g., substituted with heteroatoms such as oxygen, nitrogen, or other non-carbon atoms). In certain embodiments, the anionic and/or cationic exchange polymer electrolytes can are capable of being dissolved in chlorinated solvents, and may stay in solution at cold temperatures.

As used herein, an "alkene moiety" refers to a hydrocarbon chain containing at least one carbon-carbon double bond. An "arene moiety" refers to a monovalent or divalent aryl or heteroaryl group. An aryl group refers to hydrocarbon ring system including hydrogen, 6 to 18 carbon atoms, and at least one aromatic ring. The aryl group may be a monocyclic or polycyclic (e.g., bicyclic, tricyclic, or tetracyclic) ring system, which may include fused or bridged ring systems. Aryl groups include, but are not limited to, aryl groups derived from aceanthrylene, acenaphthylene, acephenanthrylene, anthracene, azulene, benzene, chrysene, fluoranthene, fluorene, as-indacene, s-indacene, indane, indene, naphthalene, phenalene, phenanthrene, pyrene, and triphenylene. Preferably, an aryl group is derived from benzene. A heteroaryl group refers to a 5 to 14 membered ring system including hydrogen atoms, one to thirteen carbon atoms, one to six heteroatoms (e.g., nitrogen, oxygen, and/or sulfur), and at least one aromatic ring. The heteroaryl group may be a monocyclic or polycyclic (e.g., bicyclic, tricyclic, or tetracyclic) ring system, which may include fused or bridged ring systems. The nitrogen, carbon, and/or sulfur atoms in the heteroaryl radical may optionally be oxidized, and the nitrogen atom may optionally be quaternized. Examples include, but are not limited to, azepinyl, acridinyl, benzimidazolyl, benzindolyl, 1,3-benzodioxolyl, benzofuranyl, benzooxazolyl, benzothiazolyl, benzothiadiazolyl, benzo[b][1,4]dioxepinyl, benzo[b][1,4]oxazinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzothieno[3,2-d]pyrimidinyl, benzotriazolyl, benzo[4,6]imidazo[1,2-a]pyridinyl, carbazolyl, cinnolinyl, cyclopenta[d]pyrimidinyl, 6,7-dihydro-5H-cyclopenta[4,5]thieno[2,3-d]pyrimidinyl, 5,6-dihydrobenzo[h]quinazolinyl, 5,6-dihydrobenzo[h]cinnolinyl, 6,7-dihydro-5H-benzo[6,7]cyclohepta[1,2-c]pyridazinyl, dibenzofuranyl, dibenzothiophenyl, furanyl, furanonyl, furo[3,2-c]pyridinyl, 5,6,7,8,9,10-hexahydrocycloocta[d]pyrimidinyl, 5,6,7,8,9,10-hexahydrocycloocta[d]pyridazinyl, 5,6,7,8,9,10-hexahydrocycloocta[d]pyridinyl, isothiazolyl, imidazolyl, indazolyl, indolyl, indazolyl, isoindolyl, indolinyl, isoindolinyl, isoquinolyl, indolizinyl, isoxazolyl, 5,8-methano-5,6,7,8-tetrahydroquinazolinyl, naphthyl, naphthyridinyl, 1,6-naphthyridinonyl, oxadiazolyl, 2-oxoazepinyl, oxazolyl, oxiranyl, 5,6,6a,7,8,9,10,10a-octahydrobenzo[h]quinazolinyl, 1-phenyl-1H-pyrrolyl, phenazinyl, phenothiazinyl, phenoxazinyl, phthalazinyl, pteridinyl, purinyl, pyrrolyl, pyrazolyl, pyrazolo[3,4-d]pyrimidinyl, pyridinyl, pyrido[3,2-d]pyrimidinyl, pyrido[3,4-d]pyrimidinyl, pyrazinyl, pyrimidinyl, pyridazinyl, pyrrolyl, quinazolinyl, quinoxalinyl, quinolinyl, quinuclidinyl, isoquinolinyl, tetrahydroquinolinyl, 5,6,7,8-tetrahydroquinazolinyl, 5,6,7,8-tetrahydrobenzo[4,5]thieno[2,3-d]pyrimidinyl, tetrahydro-5H-cyclohepta[4,5]thieno[2,3-d]pyrimidinyl, 5,6,7,8-tetrahydropyrido[4,5-c]pyridazinyl, thiazolyl, thiadiazolyl, triazolyl, tetrazolyl, triazinyl, thieno[2,3-d]pyrimidinyl, thieno[3,2-d]pyrimidinyl, thieno[2,3-c]pridinyl, and thiophenyl (i.e. thienyl).

As used herein, an "arene-containing linear side chain" refers to an unbranched hydrocarbon chain consisting only of carbon and/or hydrogen, wherein at least one carbon in the chain is replaced with an aryl or heteroaryl group, as defined above.

As used herein, a "non-arene-containing linear side chain" refers to an unbranched hydrocarbon chain consisting only of carbon and/or hydrogen and containing no aryl or heteroaryl groups within the chain.

As used herein, an "unsaturated linear side chain" refers to an unbranched hydrocarbon chain consisting only of carbon and/or hydrogen and including at least one carbon-carbon double bond or at least one carbon-carbon triple bond. As used herein, a "saturated linear side chain" refers to an unbranched hydrocarbon chain consisting only of carbon and/or hydrogen and containing no carbon-carbon double bonds and no carbon-carbon triple bonds.

As used herein, a "flexible hydrocarbon linear side chain" refers to a flexible connecting component as disclosed, for example, in U.S. Pat. No. 5,468,574 (Ehrenberg et al.) and U.S. Pat. No. 5,679,482 (Ehrenberg et al.).

Various types of copolymers, including block copolymers, exist that may be used with certain embodiments disclosed herein. For example, alternating copolymers include regular alternating A and B chemical or constitutional units; periodic copolymers contain A and B units arranged in a repeating sequence (e.g., (A-B-A-B-B-A-A-A-B-B)n); random copolymers including random sequences of monomer A and monomer B units; statistical copolymers including an ordering of distinct monomers within the polymer sequence that obeys statistical rules; block copolymers that include two or more homopolymer subunits linked by covalent bonds such as, for example, diblock, tri-block, tetra-block or other multi-block copolymers. See, for example, IUPAC, Pure Appl Chem (1996) 68:2287-2311.

Additionally, any of the copolymers described may be linear (including a single main chain), or branched (including a single main chain with one or more polymeric side chains) Branched copolymers that have side chains that are structurally distinct from the main chain are known as graft copolymers. Individual chains of a graft copolymer may be homopolymers or copolymers, and different copolymer sequencing is sufficient to define a structural difference. For example, an A-B diblock copolymer with A-B alternating copolymer side chains is considered a graft copolymer. Other types of branched copolymers include star, brush, and comb copolymers. Any one of these copolymers, or any mixture thereof, may be utilized with certain aspects of the disclosed devices.

In certain embodiments, the anionic exchange polymer electrolytes can include, for example, a polymer including at least one block. In certain embodiments, the polymer is a thermoplastic block copolymer. In other embodiments, the polymer is a block copolymer that includes differentiable monomeric units. Preferably, at least one of the monomeric units of the block copolymer includes an arene moiety-containing unit: In other preferred embodiments, at least one block includes a non-arene moiety-containing unit. In certain embodiments, the block copolymer includes at least two monomeric units arranged in statistically random order. In other embodiments, the block copolymer includes at least two monomeric units arranged in ordered sequence. In certain embodiments, the anionic and/or cationic exchange polymer electrolytes can include, for example, not only polymers or block copolymers, but also copolymers with other ethylenically unsaturated monomers (e.g., acrylonitrile, butadiene, methyl methacrylate, and combinations thereof).

In certain embodiments, a block copolymer can be a block copolymer having at least a first block of one or more mono alkene-arene moieties, such as styrene, ring-substituted styrene, α-substituted styrene, or any combination thereof; and a second block of a controlled distribution copolymer of a diene moiety and a mono alkene-arene moiety. The block copolymer can be any configuration of "A" and "B" blocks, and such block copolymers can be generated by a wide variety of methods known to one of skill in the art.

As used herein, a "mono alkene-arene moiety" refers to one or more alkene moieties, as defined above, covalently bonded to an arene moiety, as defined above. An example of a "mono alkene-arene moiety" is styrene. A "poly alkene-arene moiety" refers to a two or more mono alkene-arene moieties, as defined above, covalently bonded to each other to form a chain including two or more mono alkene-arene moieties. An example of a "poly alkene-arene moiety" is polystyrene. A "diene moiety" refers to a hydrocarbon chain containing two carbon-carbon double bonds. In certain embodiments, the diene moiety may be conjugated, unconjugated, or cumulated.

Some specific examples of block copolymers include, for example, those described in U.S. Pat. No. 4,248,821 (Van Dellen), U.S. Pat. No. 5,239,010 (Balas et al.), U.S. Pat. No. 6,699,941 (Handlin et al.), U.S. Pat. No. 7,001,950 (Handlin, Jr. et al.), U.S. Pat. No. 7,067,589 (Bening et al.), U.S. Pat. No. 7,169,848 (Bening et al.), U.S. Pat. No. 7,169,850 (Handlin, Jr. et al.), and U.S. Pat. No. 7,186,779 (Joly et al.), and U.S. Patent Application Publication Nos. 2005/0154144 (Atwood et al.), 2007/0004830 (Flood et al.), 2007/0020473 (Umana et al.), 2007/0021569 (Willis et al.), 2007/0026251 (Umana), 2007/0037927 (Yang), and 2007/0055015 (Flood et al.).

In certain embodiments, the anionic exchange polymer electrolytes can include, for example, a statistical copolymer. A statistical copolymer is used herein consistent with the commonly understood usage in the art. See, for example, Odian, Principles of Polymerization, 1991. Statistical copolymers can be derived from the simultaneous polymerization of two monomers and can have, for example, a distribution of the two monomeric units along the copolymer chain, which follows Bernoullian (zero-order Markov), or first or second order Markov statistics. The polymerization may be initiated by free radical, anionic, cationic, or coordinatively unsaturated (e.g., Ziegler-Natta catalysts) species. According to Ring et al., (Pure Appl Chem (1985) 57:1427), statistical copolymers can be the result of elementary processes leading to the formation of a statistical sequence of monomeric units that do not necessarily proceed with equal probability.

These processes can lead to various types of sequence distributions including those in which the arrangement of monomeric units tends toward alternation, tends toward clustering of like units, or exhibits no ordering tendency at all. Bernoullian statistics is essentially the statistics of coin tossing; copolymers formed via Bernoullian processes have the two monomers distributed randomly and are referred to as random polymers. For example, it is possible in a free radical copolymerization for the active end, in the case of one embodiment, a styryl or butadienyl radical, to have essentially no selectivity for styrene vs. butadiene. If so, the statistics will be Bernoullian, and the copolymer obtained will be random. More often than not, there will be a tendency for the propagating chain end to have some selectivity for one monomer or the other. In some cases block copolymers can be derived from the simultaneous copolymerization of two monomers when the preference of the propagating chain ends for adding the opposite monomers is very low. The resulting polymer would be categorized as a block copolymer for the purposes of the present disclosure.

Statistical copolymers generally display a single glass transition temperature. Block and graft copolymers typically display multiple glass transitions, due to the presence of multiple phases. Statistical copolymers are, therefore, distinguishable from block and graft copolymers on this basis. The single glass transition temperature reflects homogeneity at the molecular level. An additional consequence of this homogeneity is that statistical copolymers, such as those of styrene and butadiene, when viewed by electron microscopy, display a single phase morphology with no microphase separation. By contrast, block and graft copolymers of styrene/butadiene, for example, are characterized by two glass transition temperatures and separation into styrene-rich domains and butadiene-rich domains. It should be noted that membranes which are produced from statistical copolymers originally having a single glass transition temperature and a single phase morphology do not necessarily exhibit a single phase morphology or a single glass transition temperature after sulfonation because of chemical changes in the polymer effected by the sulfonation, in combination with the physical changes effected by the casting processes of the present disclosure.

Pseudo-random copolymers are a subclass of statistical copolymers which result from a weighted change in the monomer incorporation that skews the distribution from a random arrangement (i.e. Bernoullian) that is defined as statistical. Linear arrangements have been described here, but branched or grafted including star arrangements of monomers are possible as well. In addition, block copolymers of styrene and hydrogenated butadiene, isoprene, or equivalent olefin can be employed. The block architecture can be monomeric units including diblock, triblock, graft-block, multi-arm starblock, multiblock, segmented, tapered block; or any combination thereof.

In certain such embodiments, the polymer includes moieties or segments including unsaturated carbon-carbon double bonds, which are able to be sulfonated. Some examples of such polymers include, but are not limited to, polybutadiene and/or polyisoprene.

The weight of the polymers utilized in the present disclosure are preferably at least approximately 1 kilo Dalton (KD), 2 KD, 5 KD, 10 KD, 15 KD, 20 KD, 25 KD, 30 KD, 40 KD, 50 KD, 60 KD, 70 KD, 80 KD, 90 KD, or any value therebetween or greater.

Some examples of polymers or blocks of polymers that may be included in certain embodiments include, but are not limited to, polyethylene (PE), polypropylene (PP), polyethylene oxide (PEO), polystyrene (PS), polyesters, polycarbonate (PC), polyvinyl chloride (PVC), nylon, halogenated polymers or copolymers such as perfluorinated copolymers, poly (methyl methacrylate) (PMMA), acrylonitrile butadiene styrene (ABS), polyamide (PA), polyurethane (PU), polytetrafluoroethylene (PTFE), polylactic acid (PLA), polyvinylidene chloride (PVDC), styrene-butadiene rubber (SBR), styrene-ethylene/butylenes-styrene (SEBS); styrene-ethylene/propylene-styrene (SEPS), ethylene-styrene interpolymer (ESI), styrene acrylate, polyetherether ketone (PEEK), polyethylene terephthalate (PET or PETE), and any combination of these or others.

Polymers of various degrees of polymerization are also included in the present disclosure. As one of skill in the art would readily appreciate, the degree of polymerization generally refers to the number of repeat units or segments in an average polymer chain at a particular time in a polymerization reaction, where length is measured by monomer segments or units. Preferable lengths include, but are not limited to, approximately 500 monomer units, 1000 monomer units, 5000 monomer units, 10,000 monomer units, 25,000 monomer units, 50,000 monomer units, 100,000 monomer units, 200,000 monomer units, 300,000 monomer units, 500,000 monomer units, 700,000 monomer units, or greater or any value there between.

The degree of polymerization may also be a measure of the molecular weight of a polymer. Thus, the degree of polymerization is equal to the total molecular weight of the polymer divided by the total molecular weight of the repeating unit or segment. Polymers with different total molecular weights but identical composition may exhibit different physical properties. Generally, a greater degree of polymerization correlates with a greater melting temperature and greater mechanical strength.

In certain embodiments, the polymer can include a multiphase large molecular chain polymer. In some embodiments the multiphase large molecular chain polymer includes one or more arene-containing linear side chains, non-arene-containing linear side chains, saturated linear side chains, unsaturated linear side chains, and/or flexible hydrocarbon linear side chains.

In certain embodiments, the exchange polymer electrolytes can include a wide variety of anion-conducting groups so long as they are such groups that the material can display sufficient anion conductivity and moisture transfer properties. Such anion-conducting groups include an ammonium group optionally substituted with an alkyl group have 1 to 10 carbon atoms; a pyridinium group having a methyl group or an ethyl group bonded to the nitrogen atom or a pyridyl group that has formed a salt with an acid; an imidazolium group having a methyl group or an ethyl group bonded to the nitrogen atom or an imidazolyl group that has formed a salt with an acid; a phosphonium group optionally substituted with a methyl group or an ethyl group or the like.

As to the position of introduction of the anion-conducting groups into polymer block (A), there is no particular restriction, and they can be introduced either into the aromatic vinyl units or into other monomer units.

The amount of the anion-conducting group introduced can be selected depending upon the application purpose, but usually, in order to display sufficient ion conductivity for use as a polymer exchange electrolyte, the amount is preferably sufficient such that the ion exchange capacity of the block polymer is 0.3 to 4 milliequivalents/g. In certain embodiments, introduction of larger amounts can result in low mechanical strength and/or low long term durability.

Introduction of an anion-conducting group into the resulting block copolymer can be conducted by a known method. For example, the obtained block copolymer can be chloromethylated, and then reacted with an amine or a phosphine. Optionally, the chloride ions can be replaced with hydroxide ions or other acid anions. A wide variety of chloromethylation methods known in the art can be used. For example, a method including adding a chloromethylating agent and a catalyst into a solution or suspension of the block polymer in an organic solvent to chloromethylate the block copolymer can be used. A wide variety of organic solvents including, for example, halogenated hydrocarbons (e.g., chloroform or dichloroethane) can be used. Chloromethylating agents including, for example, chloromethyl ether and/or hydrochloric acid-paraformaldehyde can be used, and catalysts including, for example, tin chloride and/or zinc chloride can be used.

A wide variety of methods for reacting an amine or a phosphine with a chloromethylated block polymer can be used. For example, a method including adding an amine or phosphine (e.g., as a solution in an organic solvent) to a solution or suspension of a chloromethylated block copolymer in an organic solvent, or a material formed from the solution or suspension (e.g., a membrane), can be used. A wide variety of organic solvents can be used for preparing the solution or suspension including, for example, methanol, ethanol, acetone, and/or acetonitrile. A wide variety of amines can be used including, for example, ammonia, primary amines (e.g., methyl amine), secondary amines (e.g., dimethyl amine), and combinations thereof can be used to obtain a weakly basic anion exchange polymer; tertiary amines (e.g., trimethyl amine, triethyl amine, dimethylethanol amine, methyl diethanol amine, and/or triethanol amine) can be used to obtain a strongly basic anion exchange membrane; and diamines or polyamines (e.g., ethylene diamine or tetramethyl diaminopropane) can be used to obtain an anion exchange membrane having ion exchange groups bonded to one another.

A chloride ion can be introduced as an anion-conducting group that can optionally be converted to a hydroxide ion or another acid anion, if desired. A wide variety of methods for converting the chloride ion to another ion can be used. For example, a chloride ion can be converted to a hydroxide ion conducting group by immersing a chloride ion-containing block copolymer into an aqueous solution of sodium hydroxide or potassium hydroxide.

The ion exchange capacity of an anion-conducting copolymer can be measured using a wide variety of analytical methods known in the art including, for example, titration methods, infrared spectroscopic analysis, proton nuclear magnetic resonance ($^1$H NMR) spectroscopy, elemental analysis, or combinations thereof.

Figure 2:
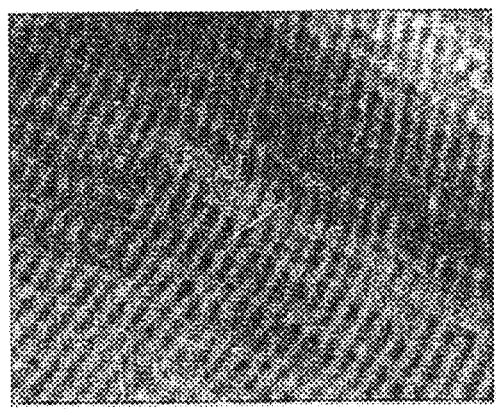
FIG. 2 is a transmission electron micrograph (TEM) of an exemplary ionomeric membrane showing nano-structure with 30 micrometer dark channels at $10^5 \times$ magnification.

In certain embodiments, each layer of electrolyte can have a lameller nanostructure. For example, certain block copolymers can self-assemble during the manufacturing process. For example, a sample of triblock 29 mol % styrene with 55% sulfonation of styrene blocks was prepared and found to exhibit two Tgs (−40° C. and 160° C.). The sample was microtomed at −100° C., stained with ruthenium tetroxide, and subjected to transmission electron microscopy (TEM). The micrograph illustrated in FIG. 2 shows lamellae thickness varying from approximately 5 to 30 nanometers. Such structures can have high ionic conductivities, and can be cross-linked for mechanical stability. The charge density of such layers can be high, exceeding commercial fluoropolymer electrolytes by a factor of 2 or 3, as measured by acid equivalents.

A multilayer alternating anionic and cationic structure including unpolarized polymer electrolyte materials as described herein, can exhibit high permittivity behavior with large frequency dependence (due to ionic conduction). The multilayer structure was a four layer alternating anionic and cationic block copolymers of moderate to low charge density. The anionic and cationic layers had been heat and pressure fused. No measures were taken to exclude environmental humidity during the testing. The test equipment was a parallel plate capacitance with moderate clamping force. A precision voltage waveform of plus or minus 1 volt with a variable frequency control of $1/1000$ of a hertz to more than a megahertz was placed across the sample and the input current monitored for phase delay and distortion. The current phase delay and distortion were used to calculate the sample capacitance and Tan Delta after subtracting out the plate and lead capacitances.

The present disclosure relates to a class of anionic exchange electrolyte polymers that when formed into membranes have two sets of related properties. The first is the selective mass transfer through a solid membrane, which can be useful, for example, for heating, ventilation, and air conditioning (HVAC), gas conditioning, desiccation, distillation, desalination, fluid separation, and purification. The second is the transport of ions through a solid membrane, which can be useful, for example, in the production of electricity in devices such as fuel cells and in the storage of electrical energy in devices such as batteries and capacitors.

Anionic exchange electrolyte membranes have been known in several forms. Each of these membranes can incorporate various sub-structures and have been typically based around an ammonium ion. But none of these membranes are known to self assemble into phases and domains, which can give the membrane superior mechanical properties and solubility resistance. In addition, these membranes known in the art have had limited ion conduction capability.

The acquisition of a desired concentration of a particular dipole (e.g., high-dipole) moment material from a material containing the dipole moment material is a common problem faced in many applications. For example, desalination is the acquisition of a nearly 100% concentration of a high-dipole moment material, namely liquid water, from a material, namely salt water (such as seawater), containing the liquid water. Further, desiccation is the acquisition of a nearly 0% concentration of a high-dipole moment material, namely liquid water, from a material, such as moist air, containing the liquid water.

Selective Permeation

Similarly, many other applications are concerned with the acquisition of a desired concentration one or more selected materials such as dissolved ions, oxides, and the like from a material containing the one or more selected materials. For example, $CO_2$ extraction from flue gas is the acquisition of a nearly 0% concentration of one or more selected materials, namely $CO_2$, from a material, namely flue gas, containing $CO_2$.

A large portion of thermal energy and electrical energy is devoted to the acquisition of desired concentrations of a particular material. Therefore, a need exists for efficient systems and processes for obtaining such concentrations. Even a small improvement in efficiency may aggregate into a large energy savings.

Heating and Air Conditioning

Membranes composed of hydrophilic polymers have been used in heating, ventilating and air conditioning systems to improve control of humidity while reducing energy costs. Systems function by allowing transfer moisture from a humid air stream to a relatively dry one. One of the functions of a HVAC (heating/ventilation/air conditioning) system in a building is to exhaust air to the atmosphere and simultaneously replenish the exhausted air with fresh air. It may be desired to adjust the temperature of the fresh air to approximately the same temperature and humidity of the exhausted air before introducing it into the building. This can require additional cooling or warming of the fresh air and the addition or removal of moisture, at a significant energy cost. In addition, this ventilating process frequently employs moving parts in the apparatus which may require periodic maintenance. In order to minimize energy and maintenance costs, it is desirable to provide a static heat and moisture exchanging core for simultaneously and continuously effecting both heat and moisture exchange between two air streams. An inexpensive water-conducting membrane having mechanical strength is desirable in order to provide an improved operating lifetime for such cores. U.S. Pat. No. 4,051,898 to Yoshino discloses the use of Japanese paper to transfer heat and moisture between fresh intake air and exhausted room air in an HVAC system. Zhang and Jiang (J. Membrane Sci., pages 29-38 (1999)) disclose an energy recovery ventilator wherein heat and water are transferred across a porous hydrophilic polymer membrane. In U.S. Pat. No. 5,348,691 McElroy et al. disclose a humidifying device wherein water is transported across a membrane composed of a perfluorocarbonsulfonic acid polymer or a polystyrenesulfonic acid. In preferred embodiments, a membrane as disclosed herein can allow the transfer of water between two gas streams separated by the membrane.

The polymer can form at least a portion of a heat exchanger configured to heat the flow of the first material to the first temperature, and when the high-dipole moment liquid joins with the second material, the high-dipole moment liquid transfers thermal energy to the second material increasing the second temperature, the system further including: a heat exchanger configured to transfer at least a portion of the thermal energy transferred to the second material to a portion of the flow of the first material before the portion of the flow of the first material contacts the membrane.

Desalination

Methods of acquiring potable water from salt water, such as brackish water, seawater, and the like, include distilling the salt water through a hydrophobic porous membrane. These membranes are typically constructed from hydrophobic materials, such as PTFE or polypropylene that have been formed into a single highly porous thin layer containing a high density of very small pores. Membranes constructed in this manner are often referred to as micro-porous membranes.

Micro-porous membranes are typically used when thermally created concentration differences across the membrane allow liquid water in contact or in close proximity with a first surface of the membrane to evaporate through the membrane into a colder environment that is in contact or in close proximity with a second surface of the membrane. Membrane material surrounding the pores at the liquid interface on the first surface of the membrane has a low surface energy and will not allow liquid to enter. Instead, the surface tension of the water forms a meniscus or "bridge" over the entrance to these pores. Water molecules transition from a low-entropy liquid state to a high-entropy vapor state within this meniscus. The water vapor diffuses into the bulk of the membrane and transits from the first surface to the second surface of the membrane, where it comes in contact with the lower temperature liquid and re-condenses. In this type of membrane, the dissolved ions in the water are left within the water meniscus covering the pores at the liquid interface.

These membranes can experience several failure mechanisms during use. The liquid meniscus, where the conversion to vapor occurs, concentrates the dissolved ions. Eventually the dissolved ion concentration can increase to the point where the dissolved ions precipitate. These precipitated ions can form a barricade over the pores curtailing the further conversion of liquid water to vapor. It can be extremely difficult to re-dissolve these precipitated ions once they form the barricade. The second failure mechanism can occur when water vapor condenses within the pores of the membrane. Once enough liquid water has condensed into the pores to form a path connecting the first and second surfaces of the membrane, dissolved ions are free to diffuse into the membrane. These dissolved ions foul the membrane internally and can be difficult, if not impossible to remove.

Existing salt-water desalination plants typically use reverse osmosis membranes. These membranes can be constructed from hydrophobic polymers and can have porosity and pore size such that only water can pass through the membrane leaving behind dissolved salts and minerals contained in the salt water. Because the materials used to construct these membranes are hydrophobic, a pressure differential may be utilized to force the water through the membrane. Therefore, the salt water is typically pressurized to force it through the membrane.

Unfortunately, the pressure can also force contaminants that would otherwise be too large to pass through the membrane into the pore structure reducing the efficacy of the membrane. Therefore, the membrane may require cleaning by periodic back-flushing, surface scouring, or the like to remove these contaminants. In order to maintain a desired production rate of desalinated water, a reverse osmosis plant is typically constructed with at least some excess capacity to allow for membrane cleaning.

Such reverse osmosis processes may utilize a considerable amount of energy to force the water through the membrane. Further, such plants can be expensive due to the complexity of the piping utilized to support the pressurized operation in addition to membrane cleaning that may be required. The reverse osmosis process can also be considered to be unstable because it can be sensitive to the type and amount of dissolved ions, organic proteins, and biota in the salt water.

Therefore, a need also exists for desalination processes that are more cost-effective, more robust, and/or less energy intensive than the reverse osmosis process. High charge density anionic electrolytes can make these processes possible either by themselves or in conjunction with cationic electrolytes. When used in conjunction with cationic electrolytes they can form zwitterionic structures that have other related anti-fouling properties.

Energy Storage

Electrical energy storage devices, such as capacitors, batteries, and ultracapacitors, store or create energy by utilizing the electric charge on two metal or otherwise electrically conductive surfaces ("electrodes"). The charge-bearing surfaces are typically separated by an electrical insulator, or dielectric. As charge is placed on the conductive surfaces, an electrical field is established between the electrodes, resulting in a voltage. Typically, a capacitor physically separates positive and negative charges, rather than chemically separating the charges, as is common in batteries. Batteries typically have limited ability to be recycled and generally cannot deliver energy as quickly as a capacitor, or without greater losses than occurs with capacitors.

A supercapacitor or ultracapacitor is sometimes called a double-layer capacitor, as it polarizes an electrolytic solution to store energy electrostatically. The energy storage mechanism of an ultracapacitor is highly reversible, which allows for the ultracapacitor to charge and discharge.

However, capacitors typically have not been able to match the energy storage capability of batteries due to the lack of available materials and structures that can tolerate electric fields of sufficient strength. There is a need for materials that tolerate high strength electric fields yet can be polarized to store energy electrostatically. In preferred embodiments, high charge density anionic electrolytes can provide that capability.

The following examples are offered to further illustrate various specific embodiments and techniques of the present disclosure. It should be understood, however, that many variations and modifications understood by those of ordinary skill in the art may be made while remaining within the scope of the present disclosure. Therefore, the scope of the disclosure is not intended to be limited by the following example.

EXAMPLES

Example 1

Chloromethylation of ESI Polymer (Entry No. SZ-2-027)

Both types of polystyrene-based copolymers, ESI and SBS, were provided by DAIS ANALYTICAL Corporation. All chemical reagents are purchased from Aldrich Company unless otherwise specified.

Figure 3:
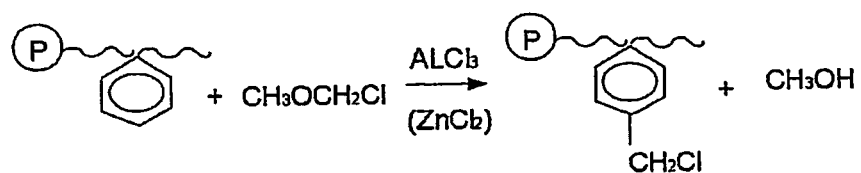
FIG. 3 is a schematic illustration of an exemplary process to convert a polymer to an anionic exchange electrolyte.
Figure 3:
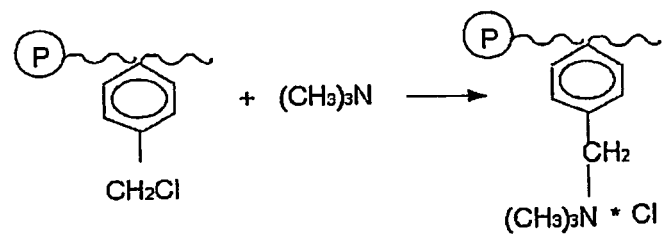

A schematic illustration of an exemplary process to convert a polymer to an anionic exchange electrolyte is shown in FIG. 3.

The chloromethylation reaction was carried in a 5 L three-necked round-bottomed flask equipped with a condenser, a thermometer and a mechanical mixer and under the protection of nitrogen, unless otherwise specified.

In this example, 200 g (Wp=Weight of polymer) of ESI polymers (P=Polymer) were used. The polymers was first completed dissolved in a solvent mixture containing 1400 mL (V1=Volume of Reactant 1) of dimethoxymethane DMM, (R1=Reactant 1) under a temperature not higher than 50° C. to yield a clear polymer solution. After cooling the polymer solution below the room temperature, 516 mL (V2=Volume of Reactant 2) of thionyl chloride (R2=Reactant 2) was added drop-wise in around 10 minutes. The reaction mixture was then allowed to warm to room temperature and keep at room temperature for another 45 minutes before was cooled down again. Then 40 mL (Ac=Amount of Reaction Catalyst) of $ZnCl_2$ ethyl ether solutions (Rc=Reaction Catalyst) was added to the reaction mixture. The reaction mixture was heated to a designed reaction temperature (Tr) and maintained at this temperature (Tr) for a period of time (Tt) until the degree of chloromethylation(Dc) reached the designed value. In this example, Tr=50° C. and Tt=32 hours were selected.

Figure 4:
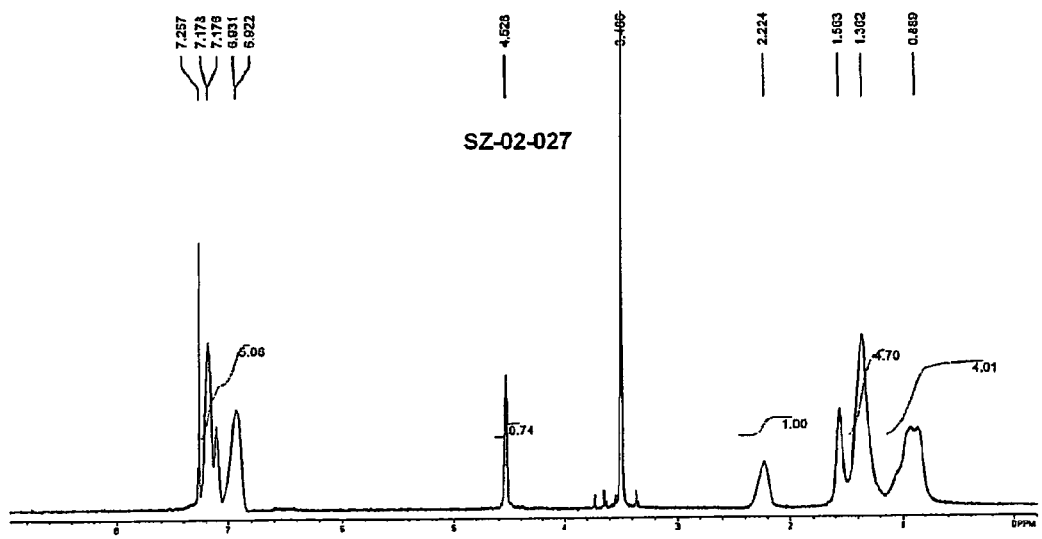
FIG. 4 is a reproduction of a nuclear magnetic resonance (NMR) spectrum of the exemplary chloromethylated ESI polymer obtained in Example 1.

After the reaction was completed, the reaction mixture was poured into 2000 mL of methanol. The precipitates were filtered out and washed with methanol three times, then dried in air to give the chloromethylated ESI polymer, CM-ESI. The chloromethylation degree was estimated from NMR spectra (FIG. 4) and a Dc=37% was obtained from this example.

Example 2

Chloromethylation of SBS Polymer (Entry No. SZ-2-086)

Figure 5:
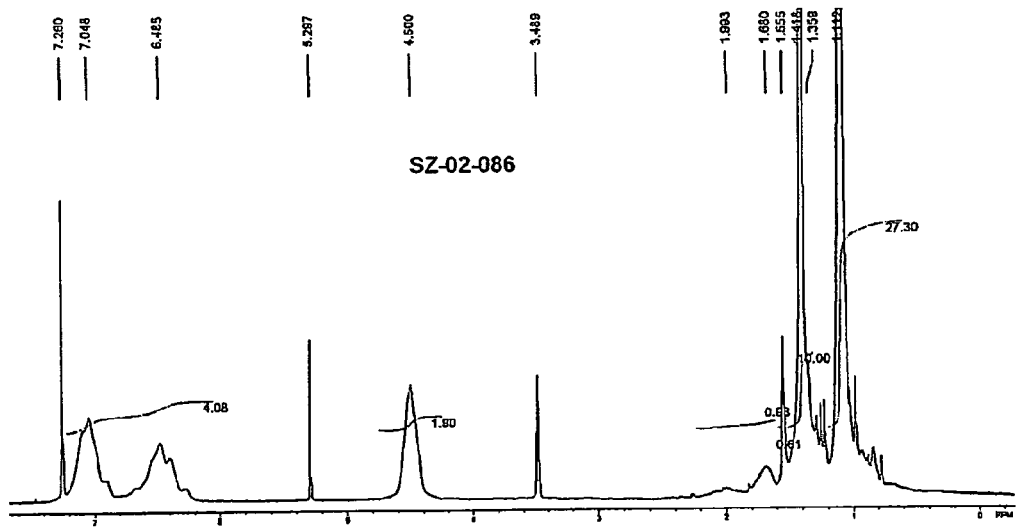
FIG. 5 is a reproduction of a nuclear magnetic resonance (NMR) spectrum of an exemplary CM-SBS obtained in Example 2.

In this example, the chloromethylation of SBS polymer was carried out following the example 1, except that:
P=SBS Polymer, Wp=150 g
R1=DMM, V1=1327
R2=Thionyl chloride, V2=1149
Rc=$ZnCl_2$ ethyl ether solutions, Ac=90 ml
Tr=40° C., Tt=24 hours This example yielded the choloromerthylated SBS polymer CM-SBS, with the a degree of chloromethylation (Dc) of 95% as estimated from the NMR spectra (FIG. 5).

Example 3

Amination of ESI Polymer (Entry No. SZ-2-097)

The amination reaction (to covert the chloromethylated polymer to a quaternary salt by alkyl amine) was carried in a three-necked round-bottomed flask equipped with a condenser, a thermometer and a magnetic mixer and under the atmosphere, unless otherwise specified.

In this example, the cholormethylated polymer CM-ESI, 15 g (WPa=Weight of the polymer for amination) was first completed dissolved in a minimum amount of a polar solvent such as DCM, DCE, choloroform, THF and the similar. Into this polymer solution, 30 mL (Va=Volume of Ra) of N,N-dimethylethanolamine, DMEOA, (Ra=Reagent for amination) was dropped into the solution. The reaction mixture was stirring for 24 h (Tta=Time of amination) at 20° C. (Ta=Temperature of amiantion). The aminated polymer was precipitated by methanol and then washed with methanol three times followed by 1 M HCl and deionized water again The cleaned aminated polymer was dried in air.

This aminated polymer may or may not be subjected to further treatment with another kind of amination regent (Ra2) depending on the desired amination degree. The amination degree (Da=Degree of Amination) was determinate by the standard titration method. In this example, no further treatment was performed, the amiantion degree was found to be 23%.

Example 4

Amination of SBS Polymer (Entry No. SZ-2-134 and SZ-2-134-TMA)

In this example, the amination of chloromethylated SBS polymer CM-SBS, obtained in Example 2, was carried in a similar procedure as described in Example 3, except that:
Pa=CM-SBS, obtained in example 2; WPa=103 g;
Ra=N,N-dimethyloctylamine, DMOA, Va=500 mL;
Ta=40° C., Tta=24 hours The obtained sample sz-2-134 (Entry 4-1 in Table 4) was further treated with another amine to yield sample sz-2-134-TMA (Entry 4 in Table 4) following the procedure below.

100 grams of the obtained animated polymer sz-2-134 (Pa=sz-2-134) was soaked in 800 mL of 25% trimethyl amine (TMA) aqueous solution (Ra) at room temperature (Ta=20° C.) for 48 hours (Tta=48 hours). Then, the polymer was filtered out from the TMA solution, and washed in sequence with deionized water, 1 M HCl, and deionized water, and dried to yield the final animated SBS polymer. The amination degree of the final polymer obtained in this example was 78%.

Examples 5-25

Examples 5-25 listed in Table 1 are chloromethylation of ESI polymer under different conditions following the procedure of Example 1.

TABLE 1

Reaction conditions and chloromethylation results for ESI polymer

| Entry Sr. | Run No. | Wp (g) | V1 (mL) R1 = DMM | V2 (mL) R2 = SOCl$_2$ | Ac (mL) Rc = ZnCl$_2$ | Tr (° C.) | Tt (hr) | Dc (%) (observation) |
|---|---|---|---|---|---|---|---|---|
| 1 | sz-2-027 | 200 | 1400 | 516 | 40 | 50 | 32 | 37 |
| 5 | sz-1-136 | 10 | 110 | 18.4 | 0.4 | 40 | 48 | 14 |
| 6 | sz-1-151 | 50 | 250 | 92 | 2.2 | 40 | 48 | 17 |
| 7 | sz-1-153 | 50 | 300 | 101 | 4.2 | 50 | 24 | 26.5 |
| 8 | sz-1-171 | 10 | 88.5 | 76.6 | 5 | 20 | 3 h | 2 |
| 9 | sz-1-171a | 5 | 44.5 | 38.3 | 2.5 | 40 | 22 | 80 (gel) |
| 10 | sz-1-173 | 25 | 175 | 64.5 | 10 | 50 | 27 | 69 |
| 11 | sz-1-176 | 25 | 222.5 | 191.5 | 12.5 | 35 | 3 | 37 |
| 12 | sz-1-177 | 50 | 350 | 129 | 10 | 50 | 21 | 68 (gel) |
| 13 | sz-1-178 | 50 | 350 | 129 | 20 | 50 | 26 | 40 (gel) |
| 14 | sz-1-179 | 5 | 35 | 13 | 2 | 50 | 20 | 22 |
| 15 | sz-1-180 | 250 | 1750 | 645 | 50 | 50 | 24 | 14.5 |
| 16 | sz-1-181 | 5 | 35 | 12.5 | 2.5 | 50 | 3.2 | 34.5 |
| 17 | sz-1-185 | 200 | 1400 | 516 | 80 | 50 | 7 | 15 |
| 18 | sz-1-186 | 200 | 1400 | 516 | 100 | 50 | 4.4 | 32.5 |
| 19 | sz-1-187 | 200 | 1400 | 516 | 100 | 50 | 7 | 22 |
| 20 | sz-2-03 | 200 | 1400 | 516 | 40 | 50 | 31 | 36.5 |
| 21 | sz-2-07 | 200 | 1400 | 516 | 40 | 50 | 25.5 | 34 |
| 22 | sz-2-015 | 200 | 1400 | 516 | 40 | 50 | 26 | 26 |
| 23 | sz-2-024 | 200 | 1400 | 616 | 100 | 50 | 34 | 39 |
| 24 | sz-2-222 | 200 | 5000 R1 = MMC | | 50 | 40 | 48 | 78 |
| 25 | Sz-2-223 | 200 | 5000 R1 = MMC | | 10 Rc = SnCl2 | 40 | 48 | 71 |

(MMC = Methoxymethyl Chloride)

Examples 26-30

Examples 26-30 listed in Table 2 are chloromethylation of SBS polymer under different conditions following the procedure of Example 2.

TABLE 2

Table of Reaction conditions and chloromethylation results for SBS polymer

| Entry Sr. | Run No. | Wp (g) P = SBS | V1 (mL) R1 = DMM | V2 (mL) R2 = SOCl$_2$ | Ac (mL) Rc = ZnCl$_2$ | Tr (° C.) | Tt (hr) | Dc (%) |
|---|---|---|---|---|---|---|---|---|
| 2  | sz-2-086 | 150 | 1327 | 1149 | 90 | 40 | 24   | 95 |
| 26 | sz-2-009 | 50  | 440  | 129  | 20 | 50 | 29   | 26 |
| 27 | sz-2-013 | 20  | 177  | 153  | 10 | 40 | 25   | 99 |
| 28 | sz-2-017 | 50  | 442  | 383  | 25 | 40 | 6.5  | 59 |
| 29 | sz-2-026 | 50  | 442  | 383  | 25 | 40 | 6.5  | 63 |
| 30 | sz-2-133 | 180 | 1593 | 1379 | 90 | 40 | 20   | 98 |

Examples 31-37

Examples 31-37 listed in Table 3 are amination of chloromethylated ESI polymer under different conditions following the procedure of Example 3.

TABLE 3

Amination of ESI polymers

| Entry No. | Run No. | Pa | WPa (g) | Ra | Va (ml) | Ta (° C.) | Tta (hours) | Da (%) |
|---|---|---|---|---|---|---|---|---|
| 3  | sz-2-97   | SZ-2-27  | 15  | DMEOA   | 30   | 20   | 24 | 23 |
| 31 | sz-2-019  | SZ-1-186 | 50  | DMOA    | 100  | 40   | 4  | 17 |
| 32 | sz-2-020  | SZ-1-186 | 25  | DMOA    | 50   | 20   | 24 | 12 |
| 33 | sz-2-85   | SZ-2-24  | 25  | DMOA    | 50   | 88.5 | 25 | 9  |
| 34 | sz-2-87   | SZ-2-27  | 15  | DMOA    | 30   | 41   | 26 | 10 |
| 35 | sz-2-89   | SZ-2-27  | 15  | TMA Gas |      | 20   | 4  | 15 |
| 36 | sz-2-236  | sz-2-222 | 100 | TMA-25% | 1500 | 20   | 24 | 64 |
| 37 | Sz-2-224* | Sz-2-236 | 5   | Methanol| 500  | 20   | 24 | 64 |

*SZ-2-224 is the 1% (wt/vol) solution of sz-2-236 in methanol

Examples 38-56

Examples 38-56 listed in Table 4 are amination of chloromethylated SBS polymer under different conditions following the procedure of Example 4.

TABLE 4

Amination of SBS polymer

| Entry No. | Run No. | Pa | WPa (g) | Ra | Va (ml) | Ta (° C.) | Tta (hour) | Da (%) |
|---|---|---|---|---|---|---|---|---|
| 4-1 | sz-2-134     | sz-2-133 | 103  | DMOA    | 500  | 40 | 24   |    |
| 4   | sz-2-134-TMA | sz-2-134 | 100  | TMA     | 800  | 20 | 48   | 78 |
| 38  | z-2-022      | sz-2-13  | 16.4 | DMOA    | 50   | 40 | 0.25 | 31 |
| 39  | sz-2-35      | sz-2-26  | 20   | DMOA    | 62.5 | 40 | 24   | 35 |
| 40  | sz-2-36      | sz-2-22  | 14   | DMOA    | 50   | 42 | 27   | 45 |
| 41  | sz-2-74      | sz-2-17  | 1    | NH3-33% | 4    | 20 | 24   | 4  |
| 42  | sz-2-75      | sz-2-26  | 2    | Pyridine| 3    | 70 | 5.5  | 17 |
| 43  | sz-2-76      | sz-2-26  | 10   | DEA     | 20   | 60 | 6.2  | 11 |
| 44  | sz-2-79      | sz-2-26  | 10   | DMOA    | 31   | 70 | 17   | 44 |
| 45  | sz-2-80      | sz-2-17  | 10   | DMOA    | 31   | 63 | 21   | 33 |
| 46  | sz-2-82      | sz-2-17  | 10   | TEOA    | 20   | 60 | 24   | 28 |
| 47  | sz-2-83      | sz-2-17  | 10   | TMA-gas |      | 50 | 2    | 5  |
| 48  | sz-2-99-1    | sz-2-86  | 0.5  | Pyridine| 5.8  | 20 | 72   | 34 |
| 49  | sz-2-99-2    | sz-2-86  | 0.5  | TMA-25% | 13   | 20 | 72   | 55 |
| 50  | sz-2-99-3    | sz-2-86  | 0.5  | DMOA    | 7.5  | 20 | 72   | 48 |
| 51  | sz-2-135     | sz-2-086 | 5    | NH3-33% | 70   | 20 | 48   | 2  |
| 52  | sz-2-118-3   | sz-2-86  | 1.1  | TEA     | 13.2 | 20 | 96   | 27 |
| 53  | sz-2-114     | sz-2-86  | 120  | DMOA    | 500  | 62 | 24   | 44 |

TABLE 4-continued

Amination of SBS polymer

| Entry No. | Run No. | Pa | WPa (g) | Ra | Va (ml) | Ta (° C.) | Tta (hour) | Da (%) |
|---|---|---|---|---|---|---|---|---|
| 54 | sz-2-128 | sz-2-114 | 100 | TMA-25% | 336 | 20 | 60 | 50 |
| 55 | sz-2-118-1 | sz-2-114 | 3 | TMA-25% | 42 | 20 | 96 | 77 |
| 56 | sz-2-118-2 | sz-2-114 | 2.2 | TEA | 23 | 20 | 96 | 52 |

Examples 57 and 58

The quaternary amination process such as using different amine and its concentration, amination temperature and amination time were investigated. The anion exchange membranes were characterized by ion exchange capacity, moisture transfer test, and ionic conductivity.

Suitable reaction conditions were found to be amination time or 24-48 hours, and an amination temperature of 35-45° C.

Example 57

The chloromethylated SEBS polymer (5 g) was dissolved in 500 ml chloroform at 35-45° C. for 24 hours. The obtained polymer solution was then filtered though the nylon screen to remove undissloved gel particles. The final casting solution (3-5 wt %) was obtained by rotary evaporator and cast onto a silicone release line to form a base membrane (approximately 1 nail thickness). The prepared base membranes were then functionalized by quaternary amination in a trimethylamine aqueous solution. The reaction conditions at this step such as trimethylamine concentration, temperature and time were investigated and shown in the Table 5. After amination the membranes were rinsed with DI water and then air dried the membrane for characterization as shown in Table 5.

Example 58

The chloromethylated SEBS polymer was dissolved in chloroform first. Then the polymer solution was functionalized by quaternary amination with slowly adding triethylamine while agitation. The reaction conditions at this step such as the amount of triethylamine used, temperature and time were investigated and shown in Table 5. After the reaction the obtained polymer solution was concentrated and then directly using for casting membrane. The membranes were soaked in DI water for 4-6 hours and then rinsed with DI water and air dried the membrane for characterization.

The membranes were characterized by ion exchange capacity, moisture transfer test, and ionic conductivity. Each property was measured for three times, respectively, to obtain an average value that listed in Table 5.

TABLE 5

Quaternary Amination of Chloromethylated SEBS Polymer

| Exam No. | CM (mol %) | CMS:TMA or TEA (mmol; mmol) | Temp (° C.) | Time (hrs) | IEC (meq/g) | Moisture transfer (g/10 min at 30° C.) | I/C (S/cm2) |
|---|---|---|---|---|---|---|---|
| 1 | 79 | 1:5 | 35-40 | 24 | 0.51 | 0.019 | |
| 2 | 79 | 1:10 | 40-45 | 24 | 0.83 | 0.035 | |
| 3 | 79 | 1:20 | 40-45 | 24 | 1.24 | 0.113 | |
| 4 | 79 | 1:1 | 35-40 | 24 | 1.10 | 0.091 | |
| 5 | 79 | 1:2 | 35-40 | 48 | 1.32 | 0.114 | |
| 6 | 76 | 1:2 | 35-40 | 40 | 1.03 | 0.104 | |
| 7 | 76 | 1:3 | 25 | 48 | 0.98 | 0.077 | |
| 8 | 76 | 1:3 | 40-45 | 24 | 1.12 | 0.107 | |
| 9 | 76 | 1:0.75 | 35-40 | 24 | 0.19 | | |
| 10 | 79 | 1:1 | 50 | 24 | 0.33 | 0.025 | |
| 11 | 79 | 1:3 | 35-40 | 24 | 1.92 | 0.129 | |
| 12 | 79 | 1:5 | 35-40 | 24 | 3.25 | 0.194 | 0.0099 |
| 13 | 76 | 1:5 | 35-40 | 24 | 3.07 | 0.162 | |
| 14 | 79 | 1:5 | 35-40 | 48 | 3.85 | 0.231 | 0.0163 |
| 15 | 76 | 1:10 | 35-40 | 24 | 4.22 | 0.271 | |
| 16 | 76 | 1:8 | 35-40 | 24 | 3.65 | 0.224 | |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A membrane having a first surface and a second surface, the membrane comprising one or more anionic exchange electrolyte polymers;

wherein the one or more anionic exchange electrolyte polymers comprise a plurality of contiguous domains, wherein the plurality of contiguous domains comprise at least a first contiguous domain and at least a second contiguous domain that are phase separated;

wherein the first contiguous domain comprises a plurality of repeat units having moieties with electrostatically bound negative ions and covalently bound positive ions;

wherein the second contiguous domain comprises a plurality of repeat units with non-charge bearing moieties; and wherein at least a portion of the first contiguous domain or at least a portion of the second contiguous domain extends from the first surface of the membrane to the second surface of the membrane.

2. The membrane of claim 1 wherein the second contiguous domain forms an elastic matrix that supports the first contiguous domain.

3. The membrane of claim 1 wherein the second contiguous domain is plastic, rubbery, or semi-crystalline.

4. The membrane of claim 1 wherein the membrane forms a permeable barrier that selectively allows molecules and/or ions that are soluble in the first contiguous domain to pass between the first and second surfaces of the membrane.

5. The membrane of claim 1 wherein the membrane forms a permeable barrier that selectively allows molecules that have large dipole moments or that can be dissolved in solvents that have large dipole moments to pass between the first and second surfaces of the membrane.

6. The membrane of claim 5 wherein the solubility of the large dipole moment molecules in the first contiguous domain is greater than 10 times the solubility in the first contiguous domain of low dipole moment molecules that do not pass between the first and second surfaces of the membrane.

7. The membrane of claim 1 wherein the membrane has high permittivity when exposed to DC or slowly varying AC voltages.

8. The membrane of claim 1 wherein the membrane has a permittivity of at least 50.

9. The membrane of claim 1 wherein the membrane has a permittivity of at least 1000.

10. The membrane of claim 1 wherein the membrane has a permittivity of at least 10,000.

11. A method for selectively mass transporting molecules and/or ions, the method comprising:
   providing a membrane according to claim 1 having molecules and/or ions in contact or in close proximity with the first surface of the membrane; and
   allowing the molecules and/or ions that are soluble in the first contiguous domain to pass between the first and second surfaces of the membrane.

* * * * *